Aug. 6, 1935.  N. H. CURTISS  2,010,061
METHOD AND APPARATUS FOR MAKING RUBBER HOSE
Filed June 23, 1932  4 Sheets-Sheet 1
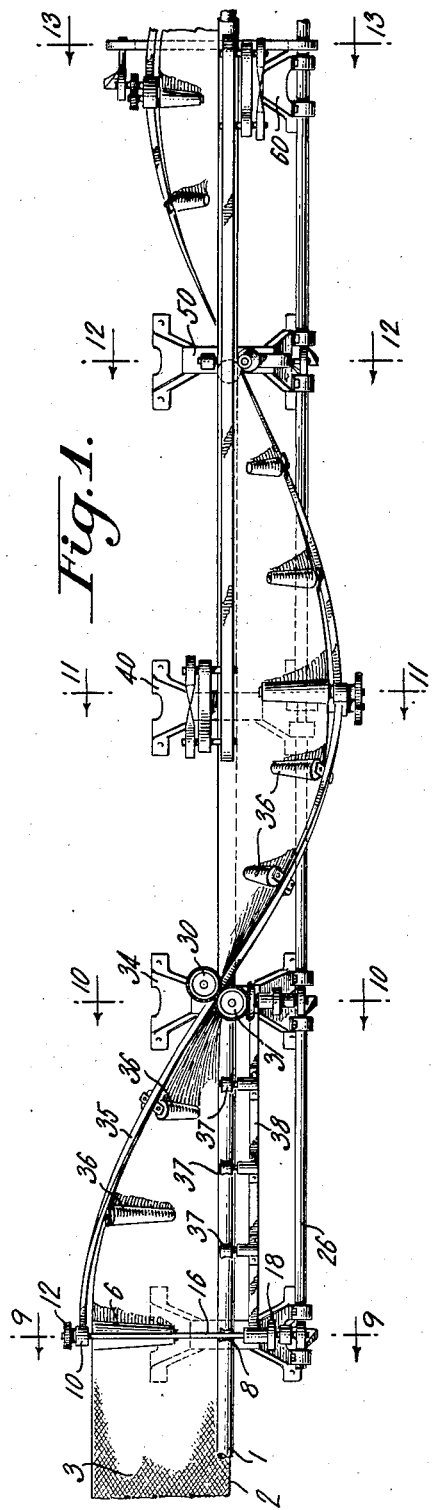
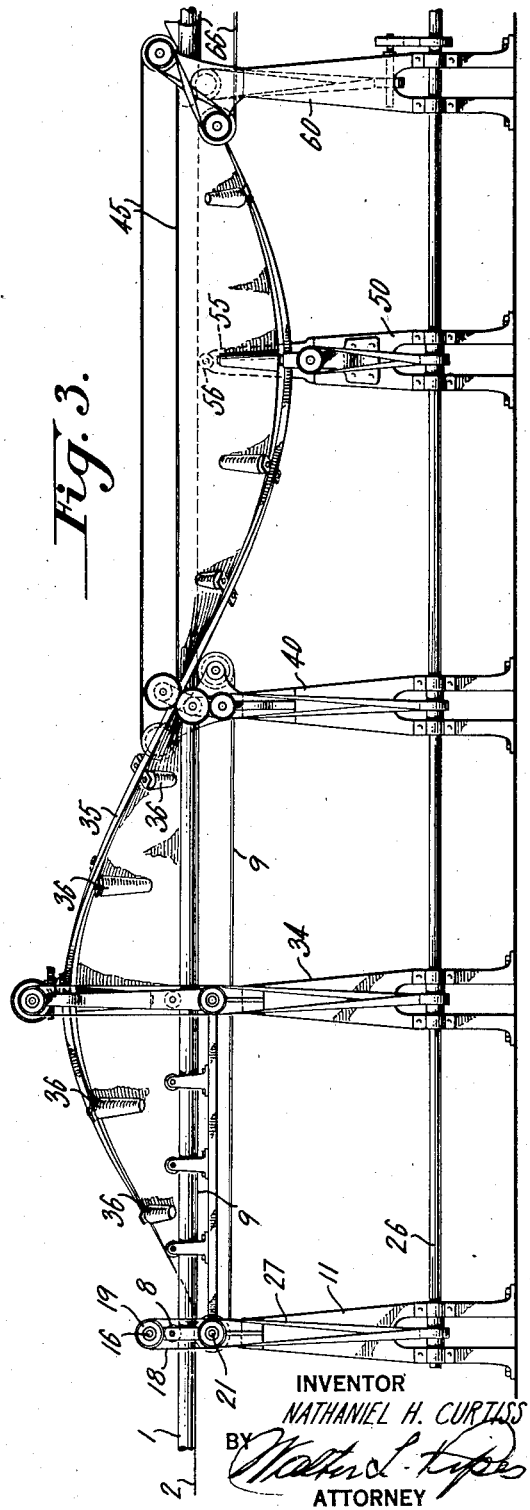
INVENTOR
NATHANIEL H. CURTISS
BY
ATTORNEY

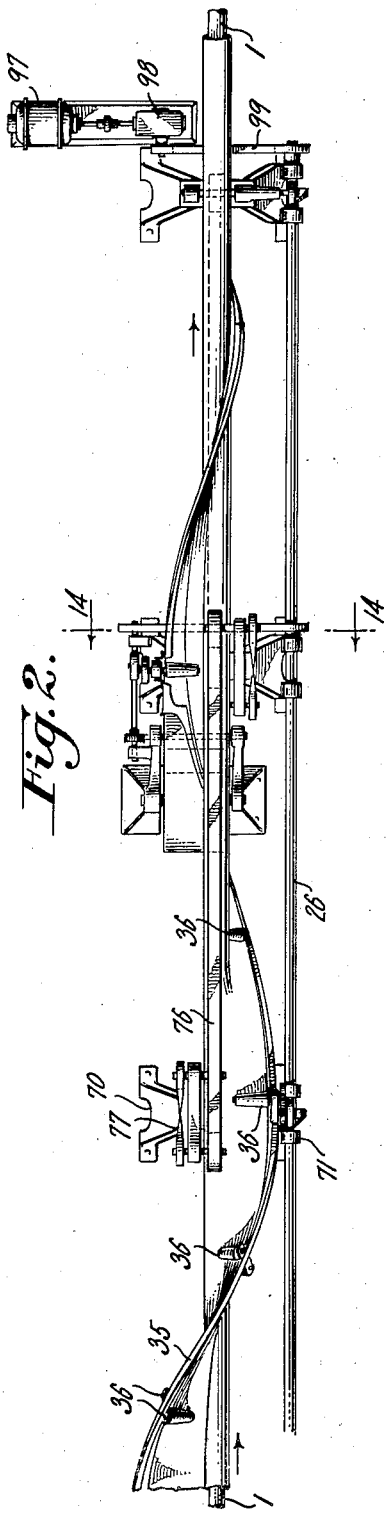
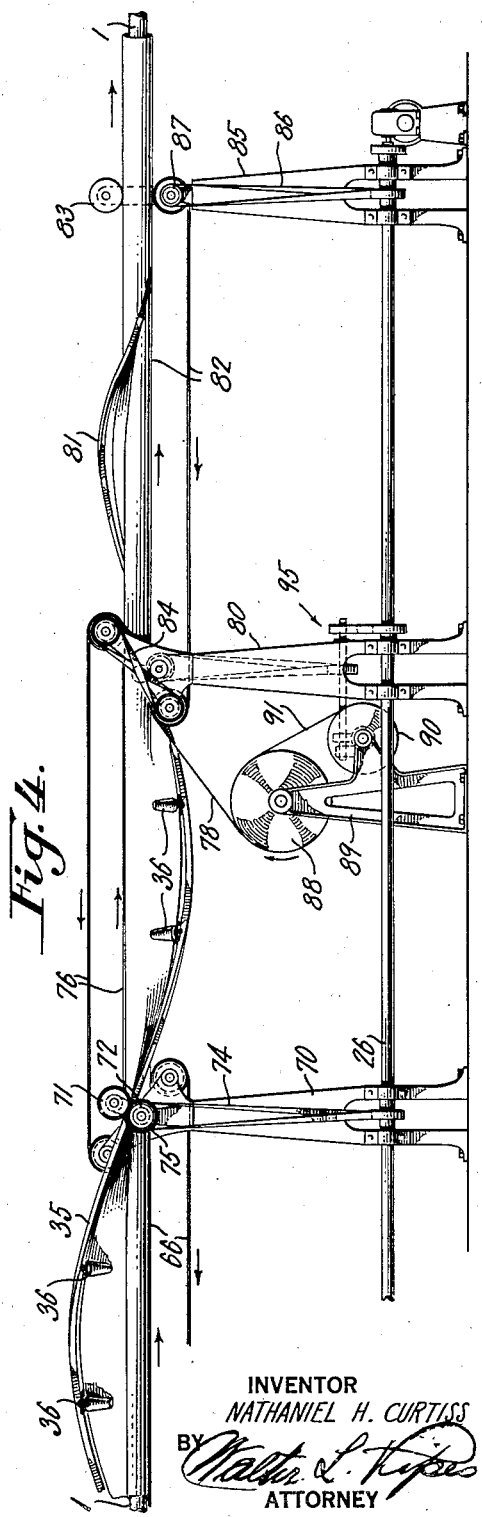

Aug. 6, 1935.    N. H. CURTISS    2,010,061
METHOD AND APPARATUS FOR MAKING RUBBER HOSE
Filed June 23, 1932    4 Sheets-Sheet 3
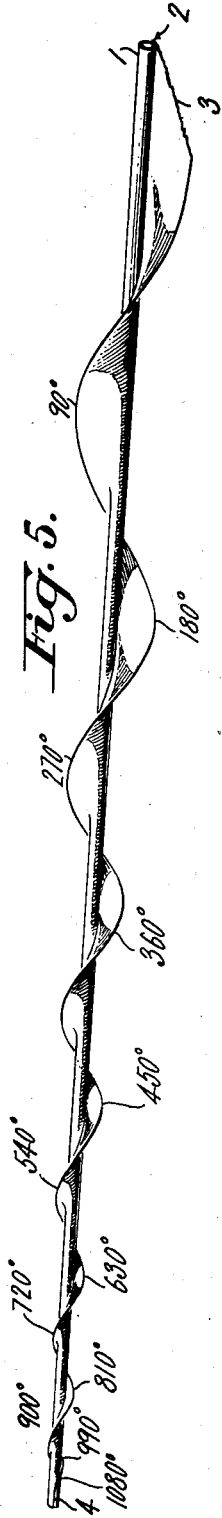
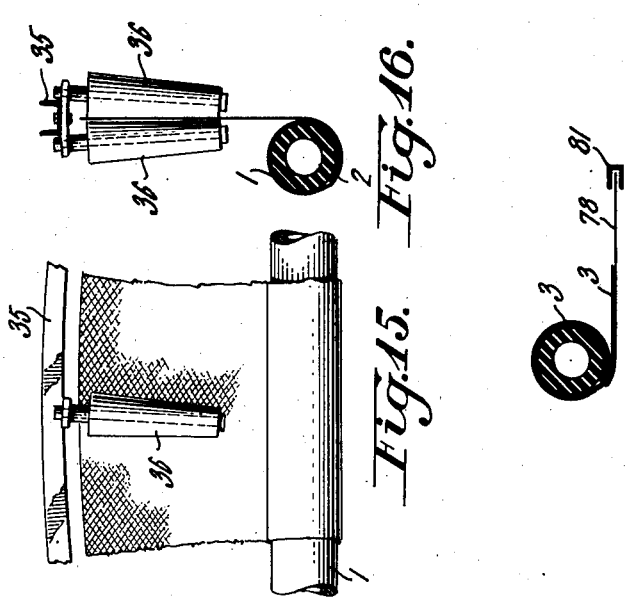
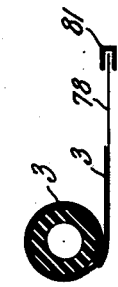
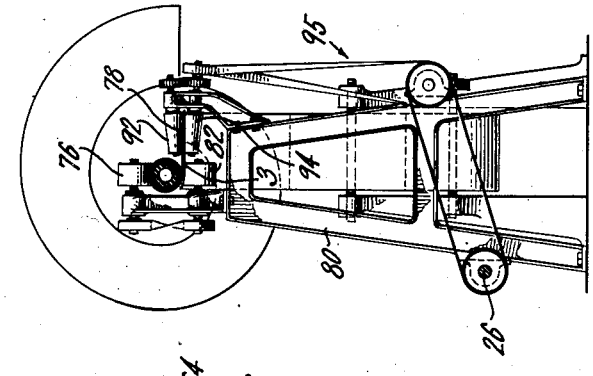
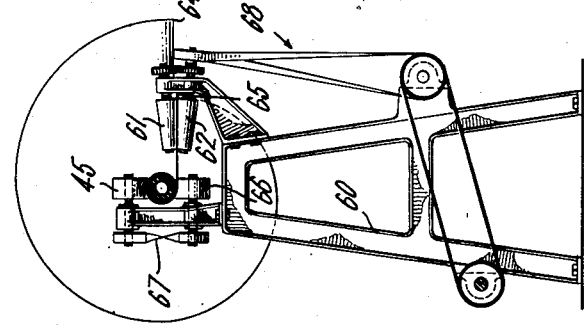
INVENTOR
NATHANIEL H. CURTISS
BY
ATTORNEY Aug. 6, 1935.  N. H. CURTISS  2,010,061
METHOD AND APPARATUS FOR MAKING RUBBER HOSE
Filed June 23, 1932  4 Sheets-Sheet 4
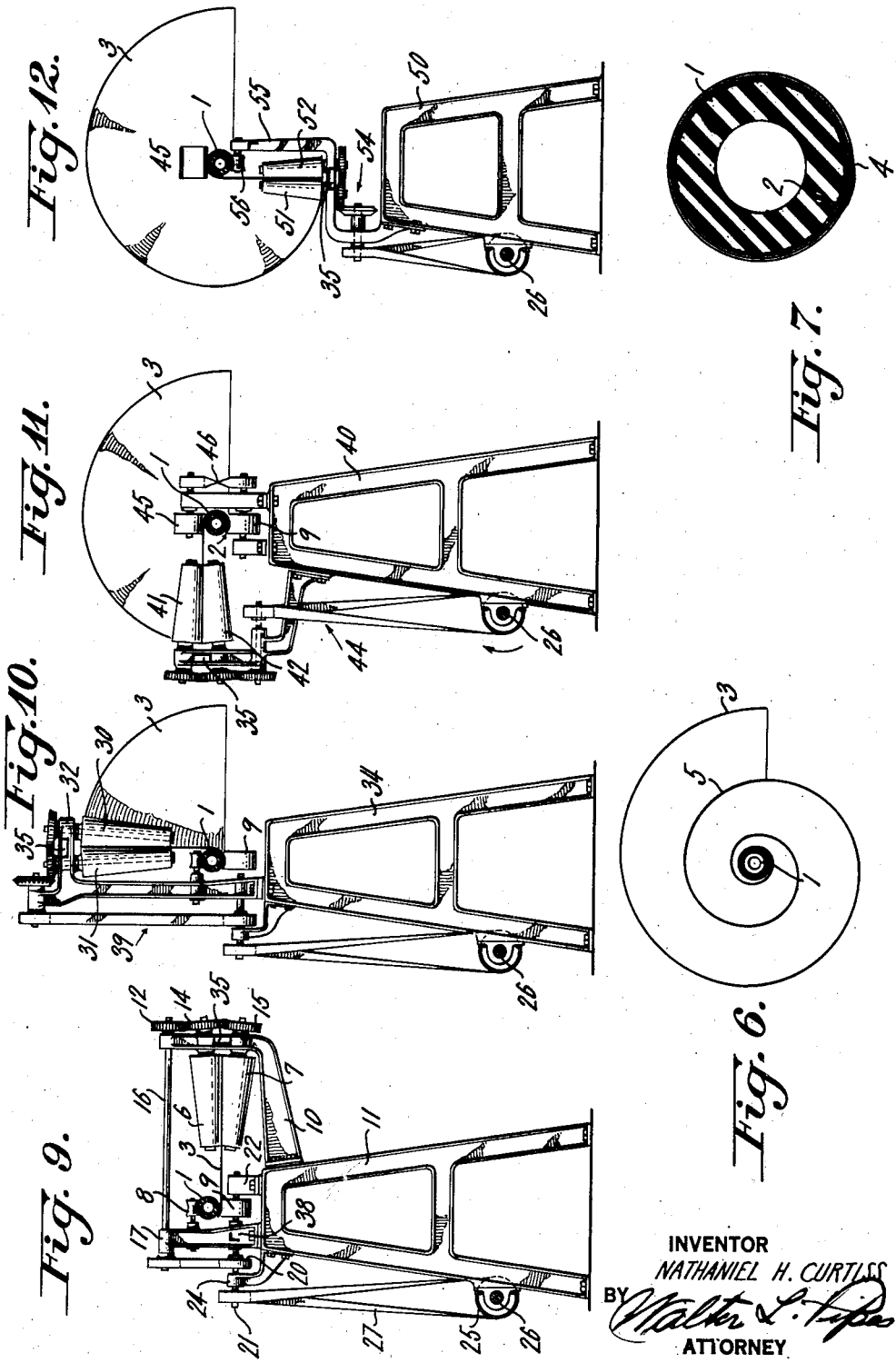
INVENTOR
NATHANIEL H. CURTISS
BY
ATTORNEY Patented Aug. 6, 1935

2,010,061

UNITED STATES PATENT OFFICE 2,010,061

METHOD AND APPARATUS FOR MAKING RUBBER HOSE

Nathaniel H. Curtiss, Passaic, N. J., assignor, by mesne assignments, to United States Rubber Company, New York, N. Y., a corporation of New Jersey Application June 23, 1932, Serial No. 618,860

12 Claims. (Cl. 154—8)

My invention relates to the method and apparatus for making rubber hose, and more particularly to the manufacture of flexible hose for use with low pressures, such as lawn hose, water hose, and the like. In the manufacture of such hose it is customary to provide a rubber tube or core which is surrounded by one or more convolutions of rubberized fabric. The fabric is, in turn, covered with one or more layers of rubber. Thereafter the hose is vulcanized to unite the convolutions of the fabric, the tube and outer rubber covering into a finished article.

Heretofore it has been customary to form the core in an extruding or tubing machine, to insert a mandrel to prevent the collapse of the tube during subsequent operations, and then to sever the tube into convenient lengths for applying the fabric and outer rubber covering. A convenient method of applying fabric to the core has been to rotate the core and mandrel relative to sheets of fabric so that the fabric is wound upon the core. The core and mandrel may be rotated about a stationary axis or a moving axis in accordance with different methods of applying the fabric. If the core is advanced longitudinally during the wrapping movement the layers of fabric are applied with their edges forming helices. The outer rubber covering has usually been applied by a simple rolling of the fabric covered tube across a sheet of rubber to form the desired number of convolutions of the rubber. Thereafter the hose was rag wrapped on the mandrel and cured. The presence of the metallic mandrel within the core has heretofore been necessary to prevent the distortion and/or collapse of the hose during such operations. These operations do not lend themselves to continuous production, but may be classified as intermittent.

By my invention I provide a continuous method of making hose in which the edges of the fabric lie in straight lines substantially parallel to the axis of the hose. The core of the hose is not rotated during the application of the fabric so that there is no twisting of the core to distort it or to complicate a continuous operation. The fabric is applied to the core without the utilization of such pressures as would tend to crush it and/or require the use of a mandrel. The fabric wrapped core may be provided with an outer covering of rubber during the wrapping operation, or it may be passed through a tubing machine, as desired.

I accomplish the foregoing results by continuously advancing a core or tube in a direction substantially parallel to the axis of the tube by the application of friction. The edge of a sheet of fabric is continuously brought into engagement with the advancing tube so that the edge of the fabric engaging the tube lies in substantially a straight line parallel with the axis of the tube. The fabric is advanced with the tube and simultaneously wrapped around the tube by a series of guiding devices so that when the tube has traveled a definite distance, the desired number of convolutions of fabric will have been applied to it. The outer edge of the fabric lies in a straight line substantially parallel to the axis of the tube. The fabric is wrapped around the tube without the application thereto of turning forces and fabric tensioning forces so that there is no need for a mandrel within the tube. The guides support the advancing fabric at different angles about the axis of the core to form a spiral shape, tension the fabric sufficiently to support it, and vary the speed of the outer fabric edge as the radius of the unwrapped portion of the fabric decreases. The number of convolutions of the fabric may be varied as desired, and also a plurality of layers of fabric may be applied simultaneously.

The resulting hose has a uniform fabric wrapping which is free from spiral joints, other than the comparatively short joints formed by attaching the sections of bias cut stocks to each other. Also, the hose may be made in any length as the continuous process does not require that the hose be broken up into such lengths as are necessitated by the use of mandrels.

The accompanying drawings illustrate a present preferred embodiment of the invention, and the present preferred form of apparatus for practicing the method of the invention, in which Figs. 1 and 2, when placed end to end, illustrate a plan view of the apparatus;

Figs. 3 and 4, when placed end to end, illustrate an elevational view thereof;

Fig. 5 is a diagrammatic perspective view of the progressive wrapping of the fabric about the core;

Fig. 6 is a diagrammatic end view of the progressive wrapping of the fabric about the core;

Fig. 7 is an end view of the fabric wrapped tube;

Fig. 8 is a diagrammatic view illustrating the application of a rubber covering to the fabric;

Figs. 9, 10, 11, 12 and 13 are transverse sectional views of the apparatus taken substantially along the section lines 9—9; 10—10; 11—11; 12—12 and 13—13, respectively, of Fig. 1;

Fig. 14 is a transverse sectional view of the apparatus taken along the section line 14—14 of Fig. 2;

Fig. 15 is an enlarged fragmentary view of an idle roll for supporting the fabric; and Fig. 16 is a view taken at substantially right angles to that of Fig. 15.

Referring to the drawings, and particularly to Fig. 5, a core or tube 1 of rubber is continuously advanced longitudinally to meet an edge 2 of a sheet of rubberized fabric 3 which moves forward with the tube and is wrapped around the tube a number of times to form a corresponding number of convolutions with the outer edge thereof coming to rest along a straight line 4, three convolutions being illustrated in Figs. 5, 6 and 7. The spiral line 5 in Fig. 6 illustrates the manner in which the outer edge of the sheet 3 is progressively reduced in radius as the tube 1 progresses. Fig. 7 illustrates the end of the hose section after the wrapping is completed. A characteristic feature of this hose is the absence of spiral laps or joints in the fabric, other than those caused by joining strips to build up the fabric 3, as the inner edge 2 of the fabric 3 lies in a straight line parallel with the axis of the tube 1 and the outer edge of the fabric lies in the straight line 4. The tube 1 is not rotated or turned during the wrapping of the fabric, as is hereinafter explained.

Referring particularly to Figs. 1 to 4, the core 1, which is preferably formed by a tubing operation, although it may be otherwise formed, is advanced to meet the edge 2 of the fabric 3 in a substantially horizontal plane before the fabric enters the bite of conical driving rolls 6 and 7, illustrated in detail in Fig. 9. At the same time the tube 1 passes beneath an idle roll 8 and onto the upper run of a conveying belt 9 which engages the lower surface of the tube for advancing it in a longitudinal direction. The edge 2 of the fabric 3 is pinched or caught between the upper run of the conveyor 9 and the tube against which it is pressed by the idle roll 8. As the fabric 3 must advance longitudinally at the same rate as the tube 1 in order to avoid excessive strain in the fabric 3 and at the same time the periphery of the fabric must move in a spiral path, the conical rolls 6 and 7 are given the proper pitch to advance the fabric without setting up undue strains therein. The fabric 3 is preferably cut on a bias to permit it to have a limited amount of stretch to compensate for the changes of shape which it undergoes during the successive convolutions of the wrapping operation.

The rolls 6 and 7 are mounted in an arm 10 which in turn is supported by a bracket 11. A gear 12 carried at the upper extremity of the arm 10 drives a gear 14 mounted on the shaft of the roll 6. The gear 14 meshes with the gear 15 carried on the shaft of the roll 7 so that the rolls 6 and 7 being on the opposite sides of the fabric 3, are driven in opposite directions at the same speed. The gears 12, 14 and 15 may be loosely fitted to compensate for the pitch angles of the rolls 6 and 7. The gear 12 is mounted on a shaft 16 extending between the arm 10 and a bearing bracket 17 extending upwardly from the bracket 11 on the opposite side of the core 1. A belt 18 drives a pulley 19 on the shaft 16 from a pulley 20 on a shaft 21. The shaft 21 extends from a bearing 22 in the bracket 11 to a bearing in an arm 24 projecting outside of the pulley 18. The shaft 21 is also provided with a bearing in the bracket 17. The conveyor 9 is driven by a pulley mounted on the shaft 21 intermediate the bearing 22 and bracket 17. With this connection the conveyor 9 and the rolls 6 and 7 are driven in synchronism. The shaft 21, in turn, is driven from a pulley 25 mounted on a line shaft 26 near the base of the bracket 11 by a belt 27. As hereinafter pointed out, the line shaft 26 constitutes a common source of power for a plurality of groups of conical drive rolls for the fabric 3, and conveyors for the core 9 so that all of the conveyors and conical drive rolls are driven in unison.

After leaving the drive rolls 6 and 7, the fabric travels to a pair of conical guide rolls 30 and 31 disposed in substantially vertical position from an arm 32 which in turn is mounted on a bracket 34. As the conical guide rolls 6 and 7 are disposed in a horizontal plane and the guide rolls 30 and 31 are disposed in a vertical plane, the fabric 3 must turn through 90° in traveling from the position of the bracket 11 to the position of the bracket 34. This transition is accomplished by providing a spiral guide 35 which substantially conforms to the shape of the outer edge of the fabric throughout its travel during the wrapping operation. In order to prevent the edge of the fabric from sagging away from the guide 35, a plurality of groups of conical idle rolls 36 are provided along the guide 35, as illustrated in detail in Figs. 15 and 16.

As shown in Fig. 15, the axes of the groups of rolls 36 are set at a slight angle to the guide 35 rather than tangentially thereto. This slight inclination of the idle rolls 36 causes the fabric to slightly stretch or be pulled outwardly in passing between each group of rolls thereby causing it to substantially conform to the shape of the spiral guide 35. Intermediate the brackets 11 and 34 the tube 1 is held against the upper run of the conveyor 9 by a group of idle rolls 37 carried on a bar 38 extending between the brackets. Accordingly, as the tube 1 progresses from the bracket 11 to the bracket 34 the fabric 3 is given a quarter turn around the core. The driving rolls 30 and 31 are driven from the line shaft 26 by a system of belts, shafts and gears, indicated generically by the reference numeral 39, in Fig. 10, and substantially conforming to the details of the driving mechanism described in detail in connection with Fig. 9.

From the area of the bracket 34 the tube 1 moves forward to the area of the bracket 40, illustrated in detail in Fig. 11. Conical drive rolls 41 and 42 mounted on the bracket 40 are connected to the line shaft 26 by gears, shafts and belts indicated generically by the numeral 44. Between the brackets 34 and 40 additional groups of guide rolls 36 are provided along the guide 35. The conveyor 9, disposed beneath the tube 1, terminates on the bracket 40 and the lower run of a conveyor 45 engages the upper surface of the tube and the fabric 3, which has been given a wrap of substantially 180° around the tube. The tension on the lower edge 2 of a fabric 3 is sufficient to insure its clinging to the tube 1 after leaving the conveyor 9. The conveyor 45 advances the tube from the bracket 40, and the drive rolls 41 and 42 advance the fabric. However, the drive rolls 41 and 42 are slightly smaller than the drive rolls 30 and 31 due to the decrease in radius of the free edge of the fabric 3. A cross belt 46 is provided between the conveyors 9 and 45. From the bracket 40 the tube advances to the area of a bracket 50, illustrated in detail in Fig. 12. As the area of the bracket 50 represents a wrap of 270° around the tube 1, the conical driving rolls 51 and 52 are mounted in a vertical position but opposite to the positions of the driving rolls 31 and 32 in Fig. 10. The driving rolls 51 and 52 are connected to the line shaft 26 by belting, shafting and gearing, indicated generically by the numeral 54. An arm 55 carries an idle roll 56 engaging the under surface of the tube 1 and holding it against the lower run of the conveyor 45. It also assists in holding the fabric edge 2 against the tube 1. From the area of the bracket 50, the tube and fabric proceed to the area of a bracket 60 carrying conical drive rolls 61 and 62 which are in turn smaller than the driving rolls 51 and 52 and bracket 50. Between the driving rolls 6 and 7 and the driving rolls 61 and 62, the fabric 3 has completed one lap of the tube. The reduction in radius of the fabric 3 between the bracket 11 and the bracket 60 is indicated by the distance between the corner 64 in Fig. 13, and the edge 65 of the fabric as it passes between the rolls 61 and 62.

At the bracket 60 the conveyor 45 engaging the upper surface of the tube and wrapped fabric is replaced by a conveyor 66, the upper run of which engages the lower surface of a tube and wrapped fabric for advancing them. A cross belt 67 connects the conveyors 45 and 66. The drive rolls 61 and 62 are connected to the line shaft by a system of belts, shafts and gears, indicated generically by the numeral 68. The speeds of the several conveyors 9, 45 and 66 are such that the tube is advanced without much tension and without causing the tube to appreciably drag the unwrapped portion of the fabric 3. Also, at all times the several conveyors are disposed substantially diametrically opposite of the tube to the unwrapped fabric so that the conveyors do not interfere with the movement of the fabric or its spiral shape. The fabric is moved forward by the action of the conical driving rolls at each bracket.

Referring to Figs. 2 and 4, the conveyor 66 extends to a bracket 70 supporting horizontal driving rolls 71 and 72 which are driven through a belt 74 and a gear train 75 from the line shaft 26. As the fabric dips below the tube 1 beyond the bracket 70, a conveyor 76 is disposed above the tube and wrapped fabric and the conveyor 66 stops. The conveyors 66 and 76 are connected by a cross belt 77.

It is to be understood that the number of convolutions given the fabric may be varied by increasing or decreasing the number of stations and the angular movement of the fabric, as desired. Accordingly, the number of degrees of wrap illustrated in the accompanying drawings is to be considered as an illustration of the invention and not as a limitation thereof. As the radial width of the unwrapped portion of the fabric 3 progressively decreases, the number of conical guiding rolls 36 may be diminished beyond the bracket 70 and may even be eliminated entirely.

Referring to Figs. 2, 4, 8 and 14, if it is desired to wrap the outer rubber covering on the hose before it is discharged from the machine, a sheet of the uncured rubber stock 78 may be attached to the fabric 3 at a bracket 80. The width of the rubber strip 78 is controlled in accordance with the number of convolutions desired. However, the overlap of the fabric and the rubber should not be such as to interpose a layer of rubber between the convolutions of the fabric. For guiding the edge of the rubber 78, a spiral channel shaped guide 81 may constitute a continuation of the guide 35 which terminates at the bracket 80. A conveyor 82, illustrated as engaging the lower surface of the wrapped tube, continues to advance the tube and covering. If desired, one or more pressure rolls 83 may be utilized to press the tube against the conveyor 82. The conveyors 76 and 82 are connected by a cross belt 84. The conveyor 82 is supported on a bracket 85 and a belt 86 is connected from the line shaft 26 to a pulley 87 for applying power to the conveyor 82. Owing to the cross connected belts between the several conveyors they are all driven in synchronism by the belt 27 on bracket 11 and the belt 86 on bracket 85.

The rubber 78 is supplied from a reel 88 mounted on a bracket 89 near the bracket 80. A receiving reel 90 is mounted on the bracket 89 for winding up the usual liner 91 which is disposed between convolutions of the rubber on the reel 88. The rubber 78 is fed between conical drive rolls 92 and 94 on the bracket 80. The pressure of these rolls causes the fabric 3 to unite with the rubber 78, which is preferably of uncured or very slightly cured stock. If the overlap of the rubber 78 and the fabric 3 is considerable, the pressure of the upper run of the conveyor 82 against the lower surface of the wrapped tube may be utilized to insure a good contact between the fabric and rubber. The rolls 92 and 94 are driven by a system of gears, belts and shafts, indicated generically by the numeral 95 from the line shaft 26. The wind up reel 90 is driven by the system 95.

Power is transmitted to the line shaft 26 from a motor 97 through a reducing gear 98 and a belted pulley connection 99. Since the line shaft 26 drives all of the conveyors and all of the conical driving rolls, it follows that they are all actuated in synchronism.

While I have shown and described a present preferred embodiment of apparatus for practicing the invention, it is to be understood that the invention may be otherwise practiced and other apparatus may be utilized within the spirit of the invention and the scope of the appended claims.

Having thus described my invention, what I claim and desire to protect by Letters Patent is:

1. In a continuous method of making hose, the steps comprising advancing a tube by translatory motion, bringing an edge of a fabric sheet into engagement with the tube, advancing the sheet with the tube, wrapping the sheet around the tube without rotating the latter, applying a rubber covering sheet to said fabric, and wrapping the covering sheet about the wrapped fabric, the peripheral speeds of the free edges of the fabric and cover being progressively reduced as the wrapping proceeds.

2. In a hose making machine, means for advancing a tube, and means for advancing a sheet of fabric with the tube comprising permanently mounted driving means adapted to contact with the fabric radially inward from the outer edge disposed in a spiral path about the axis of the tube during its advancement.

3. In a hose making machine, means for advancing a tube, and means for advancing a sheet of fabric with the tube comprising stationary driving means adapted to contact with the fabric radially inward from the outer edge and guiding means disposed in a spiral path about the axis of the tube during its advancement.

4. In a hose making machine, means for advancing a tube, and means for advancing a sheet of fabric with the tube comprising driving means and guiding means disposed in a spiral path about the axis of the tube during its advancement, the effective speed of the driving means being graduated along the advancing means to compensate for changes in the radial length of the unwrapped portion of the fabric.

5. In a hose making machine, means for advancing a tube, and means for advancing a sheet of fabric with the tube comprising driving means disposed in a spiral path about the axis of the tube during its advancement, the effective speed of the driving means diminishing progressively along the advancing means to compensate for the progressive decrease in the radial length of the unwrapped portion of the fabric.

6. In a hose making machine, means for advancing a tube, and means for advancing a sheet of fabric with the tube comprising conical driving rolls of progressively smaller size disposed in a spiral path about the axis of the tube during its advancement.

7. In a hose making machine, means for advancing a tube, and means for advancing a sheet of fabric with the tube comprising conical driving and guiding rolls of progressively smaller size disposed in a spiral path about the axis of the tube during its advancement, the axis of said guiding rolls being slightly inclined forwardly toward the axis of the tube.

8. In a hose making machine, means for advancing a tube, and means for advancing a sheet of fabric with the tube comprising conical driving rolls disposed in a spiral path about the axis of the tube during its advancement, the effective speeds of the conical driving rolls being graduated along the advancing means to compensate for changes in the radial length of the unwrapped portion of the fabric.

9. In a hose making machine, means for advancing a tube, and means for advancing a sheet of fabric with the tube comprising conical driving rolls disposed in a spiral path about the axis of the tube during its advancement, the effective speed of the conical driving rolls diminishing progressively along the advancing means to compensate for the progressive decrease in the radial length of the unwrapped portion of the fabric.

10. In a hose making machine, means for advancing a tube, and spiral shaped means for wrapping fabric about the tube as it advances, said advancing means comprising conveyors alternately engaging diametrically opposite faces of the tube and wrapped fabric for imparting movement longitudinally of the tube, each conveyor being disposed substantially diametrically opposite of the tube to the unwrapped portion of the fabric.

11. In a hose making machine, a plurality of conveyors for imparting longitudinal movement to a tube, a plurality of driving rolls disposed in a spiral curve for advancing and wrapping fabric about a tube, and interconnected actuating means for the several rolls and conveyors whereby they are synchronized.

12. In a continuous method of making hose, the steps comprising advancing a tube by translatory motion, bringing the edge of a fabric sheet into engagement with the tube, advancing the sheet with the tube, and reducing the peripheral speed of the free edge of the sheet as it is wrapped around the tube without rotation of the tube.

NATHANIEL H. CURTISS.